United States Patent
Raud et al.

(10) Patent No.: US 9,265,241 B2
(45) Date of Patent: Feb. 23, 2016

(54) SYSTEM AND METHOD FOR TREATING INSECT PESTS

(75) Inventors: Rein Arvo Raud, Eagan, MN (US); Joel Boyd Danielson, Brooklyn Park, MN (US)

(73) Assignee: Hetta Solutions, Inc., St. Cloud, MN (US)

(*) Notice: Subject to any disclaimer, the term of this patent is extended or adjusted under 35 U.S.C. 154(b) by 227 days.

(21) Appl. No.: 13/217,986

(22) Filed: Aug. 25, 2011

(65) Prior Publication Data

US 2012/0216444 A1    Aug. 30, 2012

Related U.S. Application Data (63) Continuation-in-part of application No. 13/188,718, filed on Jul. 22, 2011.

(60) Provisional application No. 61/402,304, filed on Aug. 27, 2010.

(51) Int. Cl.
*A01M 1/20*    (2006.01)

(52) U.S. Cl.
CPC .................................. *A01M 1/2094* (2013.01)

(58) Field of Classification Search
CPC ... A01M 1/20; A01M 1/2061; A01M 1/2072; A01M 1/2077; A01M 1/2083; A01M 1/2088; A01M 1/22; A01M 1/2094
USPC ............... 43/124, 125, 129, 132.1, 144, 123; 135/91, 92, 93
IPC ............................................. A01M 1/20, 13/00
See application file for complete search history.

(56) References Cited

U.S. PATENT DOCUMENTS

| | | | |
|---|---|---|---|
| 4,941,499 A | 7/1990 | Pelsue et al. | |
| 5,244,001 A | 9/1993 | Lynch | |
| 5,638,848 A | 6/1997 | November | |
| 6,302,094 B1 * | 10/2001 | Wehrly et al. | 126/5 |
| 7,168,630 B1 * | 1/2007 | Ketcha et al. | 239/13 |
| 7,195,025 B2 | 3/2007 | Choi et al. | |
| 7,481,234 B1 * | 1/2009 | Gustafson et al. | 135/91 |
| 7,690,148 B2 | 4/2010 | Hedman | |
| 2002/0062852 A1 | 5/2002 | Jopp et al. | |
| 2005/0246942 A1 | 11/2005 | Mueller et al. | |
| 2007/0283986 A1 | 12/2007 | Baum | |
| 2009/0211148 A1 | 8/2009 | McCarty | |
| 2010/0071258 A1 | 3/2010 | Molnar et al. | |
| 2011/0113674 A1 * | 5/2011 | Levy | A01M 13/003 43/125 |
| 2011/0289825 A1 * | 12/2011 | James | A01M 1/2094 43/132.1 |
| 2012/0060407 A1 * | 3/2012 | Lindsey | A01M 1/2094 43/124 |

(Continued)

OTHER PUBLICATIONS

Printout from http://www.bedbugchaser.com/about_BedBug_Chaser.html, dated Jun. 14, 2011, 1 page.
Chromalox, Inc. brochure for ThermEx heater, undated, 1 page.

(Continued)

*Primary Examiner* — Lisa Tsang
(74) *Attorney, Agent, or Firm* — Skaar Ulbrich Macari, P.A.

(57) ABSTRACT

A system and method for the treatment of insect pests and their eggs is disclosed. A collapsible enclosure is provided which operates under positive pressure to heat treat household or other items placed therein. A controller may be provided in certain embodiments to allow programming of a treatment cycle.

11 Claims, 9 Drawing Sheets

(56) References Cited

U.S. PATENT DOCUMENTS

2012/0233907 A1* 9/2012 Pattison .............. A01M 1/2094
43/124
2013/0269239 A1* 10/2013 Whitley ................ A01M 19/00
43/132.1

OTHER PUBLICATIONS

Fantech, Installation and Maintenance Instrucitons for Model FG, Jul. 18, 2007 and Apr. 7, 2010, 10 pages.
Lupo, Lisa, "Treating with Heat, A Simple Principle—A Complex Application", QA Magazine, Mar./Apr. 2008, 4 pages.
Brochure for "Insect Heat Treatment—Food Processing Plants, Warehouses& Bins/Silos", Temp-Air, undated, 2 pages.
Press Release for NORPACR2, Artic Outdoor Shelter Fabric, dated prior to Aug. 2007 ice fishing season, 1 page.
Pereira et al., "Lethal Effects of Heat and Use of Localized Heat Treatment for Control of Bed Bug Infestations", Journal of Economic Entomology, vol. 102, No. 3, Entomological Society of America, Jun. 2009, 7 pages.
Printout from http://www.mypmp.net/bed-bugs/the-heat-on?print=1 made on Dec. 4, 2009 of post dated Nov. 23, 2009, 1 page.
Technology Fact Sheet for Propane-Fueled Thermal Remediation, Propane Education and Research Council, Mar. 2007, 2 pages.
Temp-Air product literature entitled "Pest Control", undated, 2 pages.
Tjernlund ventilation products brochure, copyright 2009, 4 pages.
Tjernlund AireShare Ventilators products brochure, Jan. 2009, 2 pages.
Tjernlund UnderAire Crawl Space Ventilators products brochure, 2006, 2 pages.
Smith, Charles "Turning the heat up under infested homes/popular alternative to fumigation attacks, mold and fungus" posted on SFGate.com dated Aug. 30, 2003, accessed via http://articles.sfgate.com/2003-08-30/home-and-garden/17505027 1_heat-treatment-fumi . . . on Dec. 15, 2009, 2 pages.
Kells, Stephen, "Key Findings on Bed Bug Behavior at Lethal & Sub-Lethal Temperatures", Department of Entomology, University of Minnesota, May 2009, 2 pages.
Leventhal, Stephanie, "UF creates cheap way to battle bed bugs", article from The Independent Florida Alligator, Jul. 14, 2009, 3 pages.
Pereira et al, "Bed Bugs, Containerized Fumigation and Heat Treatment", Univ. of Florida, Sep. 2008, 100 pages (uploaded to EFS in two parts due to file size).
Literature: BED BUG: Heat Treatment Equipment and Application Training, Temp-Air, undated, 2 pages.

* cited by examiner

SYSTEM AND METHOD FOR TREATING INSECT PESTS

CROSS-REFERENCE TO RELATED APPLICATIONS

The present application is a continuation-in-part of application Ser. No. 13/188,718 filed on Jul. 22, 2011, entitled "System and Method for Treating Insect Pests" and claims priority under 35 U.S.C §119(e) to provisional Application Ser. No. 61/402,304 filed on Aug. 27, 2010, entitled "Portable Heat Chamber and Methodology For Use in Pest Control Applications" and incorporates the entire contents by reference.

BACKGROUND OF THE INVENTION

1. Field of the Invention

The invention relates to systems and methods for killing insect pests including all life stages. More particularly, the present invention relates to systems and methods for killing all life stages of bed bugs.

2. Description of the Related Art

A variety of techniques and instruments have been developed for use in the killing insects, such as bed bugs, in buildings. By way of a non-limiting illustration, bed bug infestations were a common part of life in much of North America before the use of chlorinated hydrocarbons such as DDT and other synthetic insecticides became widespread in the 1940s and 1950s.

Though never completely eradicated, their presence has been minimal until their recent resurgence in many countries including, but not limited to, the United States, Canada, Australia and some European countries. Their resurgence has been a devastating and expensive event in the lives of many people today. In rental property and the hospitality industry among others, bed bug infestations have had legal ramifications. Throughout the world, large cities are being overwhelmed by bed bug proliferation. In apartment buildings and other attached dwellings, bed bug infestations can be particularly widespread from one dwelling to another. People face risks of possible exposure to pesticides, and are experiencing loss of belongings, and financial distress as they deal with an infestation. Although various infectious agents have been found in bed bugs, there has never been clear documentation of transmission of any disease. For example, studies show that hepatitis B can be carried by bed bugs, but transmission is thought to be unlikely. Similar difficulties and hazards accompany other insects.

The pesticide treatment approach often requires multiple visits and may not always be effective due to pesticide resistance and dispersal of the insects. For example, according to a 2005 survey, only 6.1% of companies claim to be able to eliminate bed bugs in a single visit, while 62.6% claim to be able to control a problem in 2-3 visits. Insecticide application may cause dispersal of bed bugs to neighboring areas of a structure, spreading the infestation. Furthermore, the problem of insecticide resistance in bed bug populations increases their opportunity to spread. Studies of bed bug populations across the United States indicate that resistance to pyrethroid insecticides, which are used in the majority of bed bugs treatments, is widespread. Treatment failures are prevalent and repeated services can be financially devastating and time consuming Exterminators may require individuals to dispose of furniture and other infested materials.

In many pest control situations, including but certainly not limited to bed bugs, chemicals are the primary method of gaining control over an infestation. In some situations, however, chemicals are not permitted to control insect infestations, either because of toxicity to humans or because the chemicals have a detrimental effect on the materials being treated, e.g., taxidermy mounts. Moreover, the FDA and other levels of governments in the United States and Canada have de-labeled the use of certain chemicals for use on furniture and other household articles that are in regular contact with humans.

Alternative methods of mattress treatment are highly desirable instead of contaminating mattresses and other household furnishings with insecticides. Spraying the furnishings with insecticides is undesirable (and illegal by label requirements) since, sufficient time must be given after application before the furnishings that come in contact with humans (not only mattresses, but also chairs and couches) can be used again and there is a risk of the user having an allergic reaction to the chemicals, not to mention other possible health risks including cancer and acute neurotoxicity. Concerns over the possible effects of pesticides on the health of people and pets, as well as the dispersal of bed bugs to neighboring dwellings due to repellent effects of insecticides, make the practice of chemically treating these items problematic.

Moreover, disposal of items such as mattresses, box springs, couches etc. is a costly process and rarely solves the problem. This also aids in the spread of bed bugs to other locations if another individual finds a disposed item and decides to use it in their home. Instead, new furniture is usually infested. The movement of infested furniture also facilitates the spread of insects such as bed bugs. Vacuuming helps reduce insect infestations, but does not eliminate insects hidden inside of items.

Freezing equipment is used to kill insect pests with cold temperatures. An example of this would be Cryonite, which uses the cooling properties of $CO_2$, spraying a snow at a temperature of $-78.5°$ C. Though insects and particularly bed bugs can tolerate a broad range of temperatures, $-14$ to $44°$ C., they cannot survive body freezing or extreme heat. As with approaches such as vacuuming and steaming, freezing sprays may not reach insects that are hidden inside walls, furniture or appliances.

A variety of heat treatment techniques are known, each suffering from disadvantages that may be improved by the present invention. For example, steam treatment can effectively kill all stages of insects, including bed bugs. Unfortunately, insects hide in a diversity of places, making steam treatment very tedious, labor intensive and time consuming. There is also the risk of the steam not penetrating materials enough to kill hidden insects. The steam may also damage materials such as varnished wood, or cause mold from the moisture left behind. In addition, steam treatment requires repeated and very thorough steaming of the mattress, box spring, bed frame, bed covers, pillows, not to mention other materials and objects within the infested room, such as carpets and curtains.

A clothes dryer can be used for killing all life stages of insects in clothing and blankets. Infested clothes and bedding are first washed in hot water with laundry detergent then placed in the drier for at least 20 minutes. However, this does not eliminate insects in the mattress, bed frame and surrounding environment. Sterilized fabrics from the dryer are thus easily re-infested. Continually treating materials in this fashion is labor intensive, and in itself does not eliminate the infestation.

Control of insects via heat techniques involves raising temperatures to or above the killing temperature for insects which, for most insects including bed bugs is around $45°$ C. or 113° F. for a sustained period. Heat treatments are generally carried out by professionals, and may be performed for a single dwelling or even to heat treat an entire building. Some of the drawbacks for heat treatments include the amount of time required to raise core temperatures (interior temperature of materials) high enough to effectively kill insects that may have taken refuge within materials. The setup in order to effectively heat treat materials in the room, as well as insertion of heating ducting into the building through windows can be intrusive and cause embarrassment to the person affected. Following a heat-treatment, a room may be easily re-infested, as insects are able to retreat into cracks and crevasses in walls, ceilings and floors, where they may escape treatment by finding cool spots.

Thus, the known treatment techniques have major disadvantages and, as a result, a viable treatment gap exists that allows the population of insects, including but not limited to bed bugs, to flourish and spread to the current epidemic proportions.

The present invention overcomes these deficiencies.

BRIEF SUMMARY OF THE INVENTION

The invention provides a system and method for elimination of insect pests and their eggs. A collapsible enclosure is provided which operates under positive pressure to heat treat household or other items placed therein. A primary controller controlling a primary heater and at least one secondary controller, each secondary controller in connection with a secondary heater is provided in certain embodiments to allow programming of a treatment cycle.

The Figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

Figure 1:
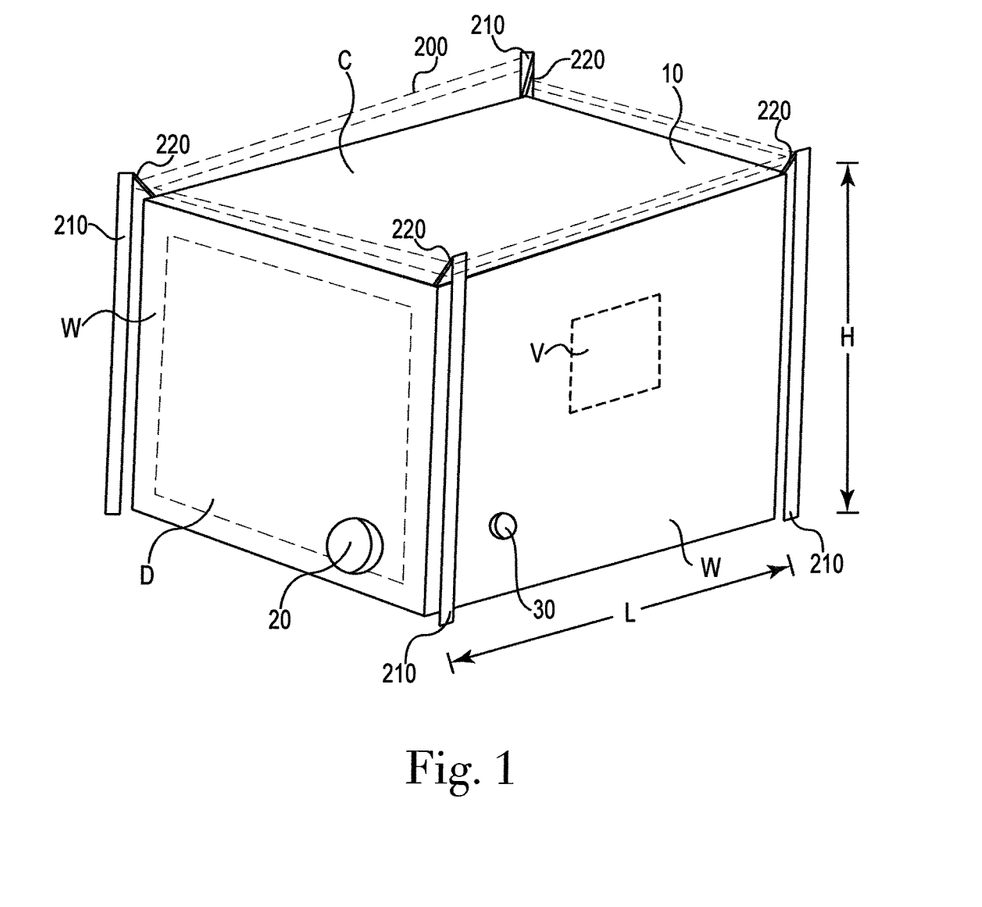
FIG. 1 is a partial cutaway perspective view of one embodiment of the present invention.
Figure 2:
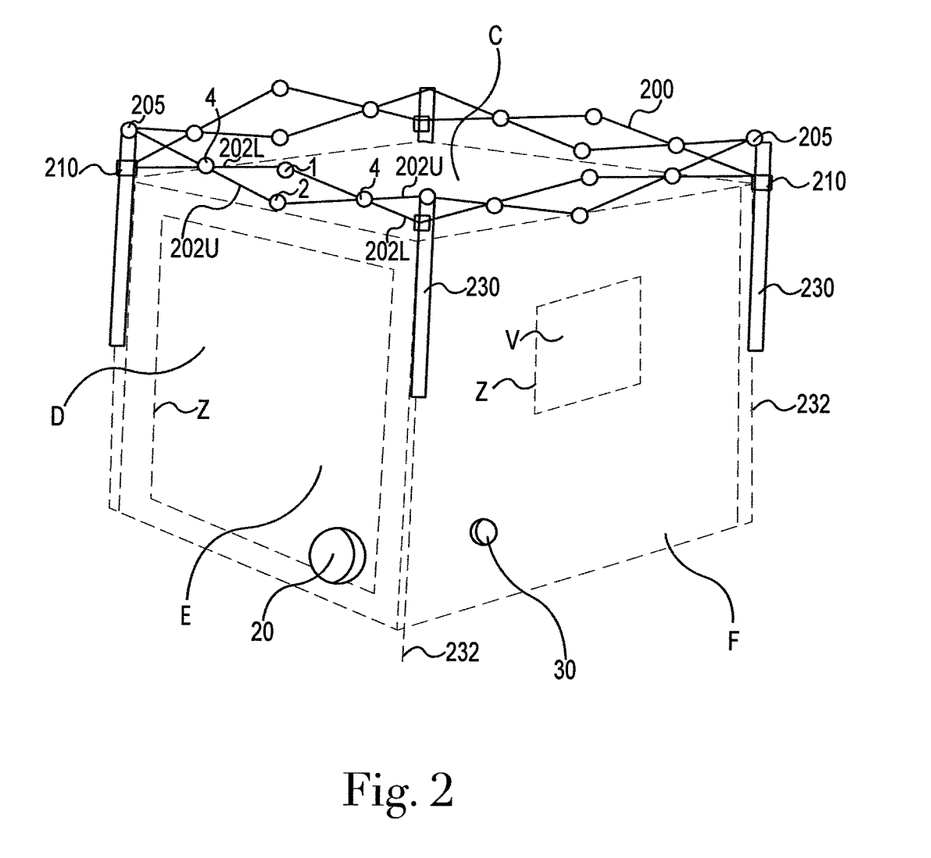
FIG. 2 is a partial cutaway perspective view of one embodiment of the present invention.

One embodiment of the portable heat chamber system 10 of the present invention is illustrated in the Figures. As illustrated in FIGS. 1 and 2, the system 10 comprises an enclosure E which is defined by enclosure walls W, preferably four, though three walls or more than four walls may be employed, an enclosure floor F and an enclosure ceiling C. The enclosure E comprises the sealed environment within which articles, e.g., furniture and the like, may be placed and treated using the present invention. The enclosure E further comprises at least one door D defined in one enclosure wall W and at least one viewing window V defined in at least one enclosure wall W. The enclosure E further preferably comprises an insulated flexible material for the enclosure walls W, including the door D, and ceiling C to prevent heat loss from inside the enclosure E during operation. The enclosure floor F preferably comprises a tough thick durable vinyl as is well known in the art.

The system 10 further comprises a framework 200 for supporting the enclosure E, and a self-contained heater unit used inside the enclosure to provide a heat chamber space within in which articles such as furniture, mattresses, box springs and the like are treated for insect, e.g., bed bug, infestations. Furniture standoffs and racks, discussed in further detail infra, are also elements of certain embodiments of the present invention, wherein the standoffs and racks are configured to facilitate air flow and homogeneous temperature saturation of the enclosure therethrough and into the furniture and other items that are supported on the standoffs and racks.

The at least one door D and the at least one viewing window V comprise three-sided continuous heavy-duty zippers Z around at least part of the perimeter of the door(s) and window(s); such a zipper Z is known to the skilled artisan. In addition, the at least one door D and at least one viewing window V comprise hook and loop material flaps, also well known in the art, disposed thereon around at least part of the perimeter of the opening defined in the at least one wall W. The viewing window V may be comprised of a plastic material, e.g., plexiglass or the equivalent, that allows vision therethrough and that can also withstand temperatures experienced within the enclosure of 140 F or higher, such materials are well known in the art and not an element of the present invention. Alternatively, the viewing window(s) V may be simple cutouts in the enclosure wall(s) W, with the heavy duty zipper Z and hook and loop material providing, in combination, the necessary sealing around the viewing window(s) during operation.

The combination of heavy-duty zipper Z and hook and loop material is provided for several reasons: to minimize heat loss during operation, to maintain the required positive pressure within the heat chamber enclosure E during operation and to prevent any insect escape from within the enclosure E prior to or during the operation.

In addition, at least two access ports are defined in walls of the heat chamber enclosure. As seen in FIG. 1, system 10 further comprises a fresh air port 20 which is illustrated as being defined within the at least one door D. The fresh air port 20, however, be defined in any enclosure wall W of the enclosure E and need not be defined through the door. Further, system 10 comprises a utility access port 30 that is defined on one of the walls W, in a position that is also near the floor F. The utility access port 30 provides electrical access for providing power to the heater and blower unit 100 that is disposed inside of the heat chamber enclosure E.

The enclosure E is formed preferably in the case of the four-wall embodiment as in FIGS. 1 and 2, in a square or a rectangle, though other geometric configurations may present themselves to the skilled artisan, each of which is within the scope of the present invention. For example, as discussed supra, a three-walled heat chamber enclosure E may be provided. Or, alternatively, an "X" sided heat chamber enclosure E may be provided, wherein "X"=3 or greater and wherein X indicates the number of walls W that comprise and define the heat chamber enclosure E. In each case, the "X" sided enclosure E also comprises a floor F and a ceiling C as discussed supra.

Figure 3A:
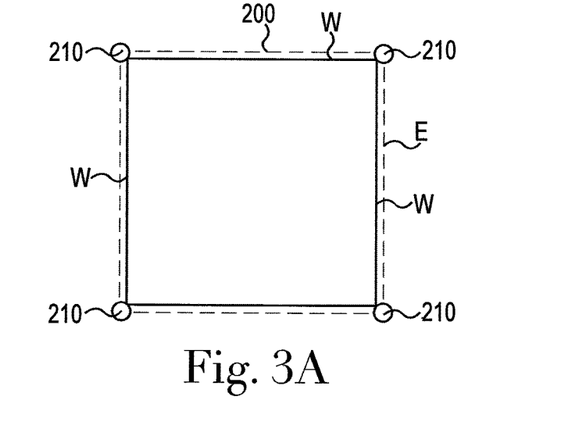
FIG. 3A is a top partial cutaway view of one embodiment of the present invention.
Figure 3B:
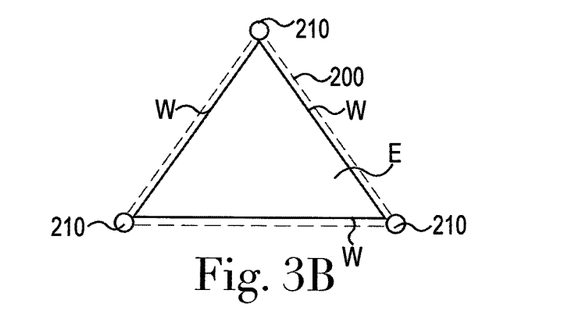
FIG. 3B is a top partial cutaway view of one embodiment of the present invention.
Figure 3C:
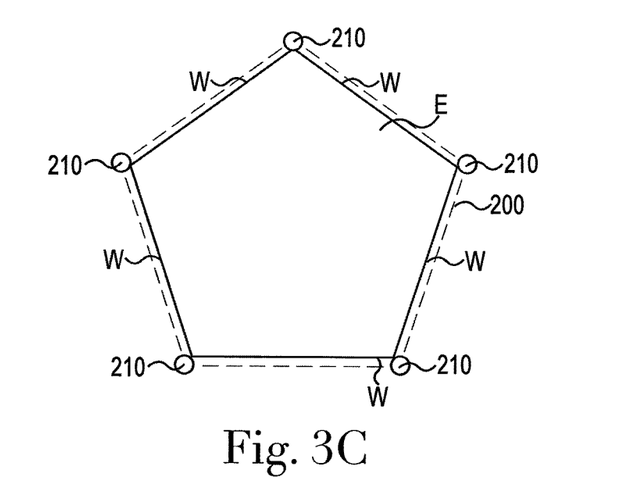
FIG. 3C is a top partial cutaway view of one embodiment of the present invention.

With reference to FIGS. 3A-3C, some alternative designs are illustrated in top view, with the framework 200 shown in dashed lines. FIG. 3A provides a substantially square enclosure E with four walls W and, accordingly, four corner posts 210 disposed at each corner where adjacent walls W intersect. Similarly, FIG. 3B illustrates a three-walled embodiment of enclosure E, comprising three walls W and associated corner posts 210 in framework 200 and FIG. 3C comprises a five-walled enclosure E comprising five walls W and associated corner posts 210.

As illustrated in FIGS. 1 and 2, the exemplary and preferred enclosure E comprises four walls W of equivalent length L and height H. An exemplary length L is eight feet and an exemplary height H is 7 feet. This dimensioning allows 2 king bed mattresses and box springs and the average couch or sofa to be inserted into the heat chamber enclosure E for treatment. Other dimensions are of course possible and within the scope of the present invention.

The heat chamber enclosure E is supported by an exterior framework 200 that is sufficiently rigid and strong to support the walls W of enclosure E in a substantially vertical position so that the ceiling C is raised upwards to create the heating chamber space within. The framework 200 comprises corner posts 210 in the same number as the number X of walls W of the heat chamber enclosure E, each corner post 210 being disposed at the intersection of adjacent walls W, the point at which a corner of the heat chamber enclosure E is defined.

Figure 4:
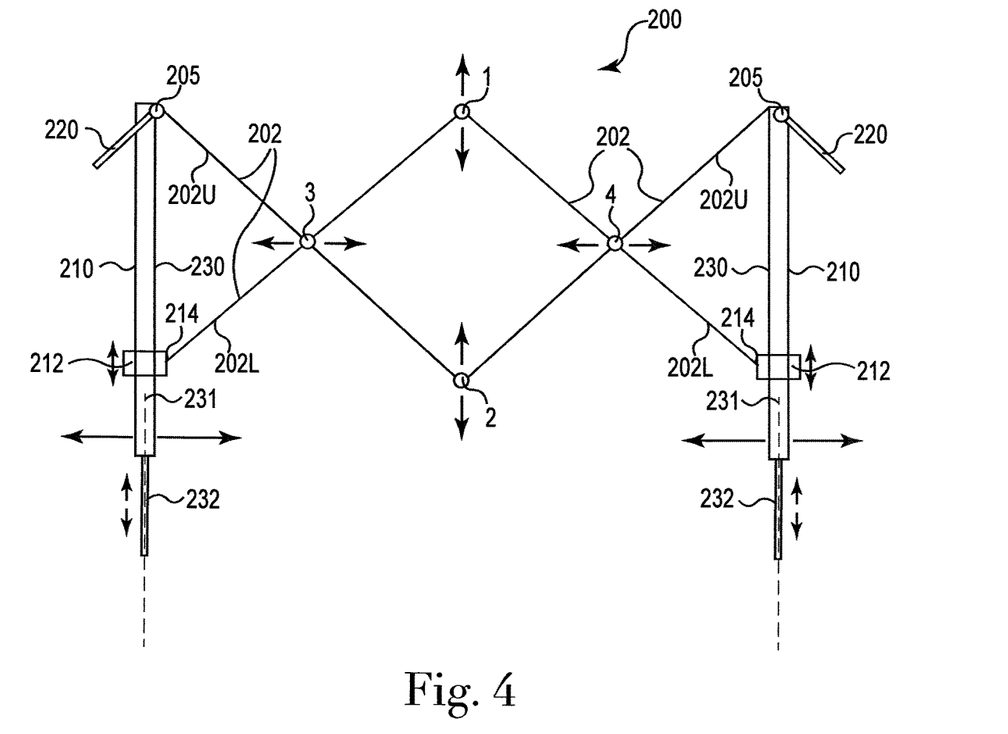
FIG. 4 is a cutaway side view of one embodiment of the present invention.

As best illustrated in FIG. 4, a preferred framework 210 is illustrated as comprising two interconnecting segment pairs 202 disposed and in operative connection with the corner posts 210. Corner posts 210 are illustrated as comprising a telescoping structure having a larger diameter receiver 230 with a channel 231 therein and a smaller diameter extender 232 with a diameter that fits within the channel 231. Such an arrangement is well known in the art and is used to expand and collapse each corner post 210. Each corner post 210 is in further operative connection with the heat chamber enclosure E, as illustrated, as being connected to the corner of enclosure E at a point substantially near the corner adjacent the corner post 210, by a tether 220. Alternatively, tether 220 may operatively connect with the intersection of the ceiling C and wall W. Still more alternatively, the operative connection of the segment pairs 202 with the heat chamber enclosure E may comprise releasable clips as known to the skilled artisan that clip to the adjacent corner of enclosure E and/or edge between the ceiling C and the walls W, thereby holding the enclosure E in an open position.

The framework embodiment 200 in the illustrations further comprises a series of compressible and expandable interconnected segment pairs 202 which may allow contraction of the framework 200 by bringing adjacent corner posts 220 together. Alternatively, the framework 200 may be expanded by moving the adjacent corner posts 220 away from each other, in the embodiment illustrated in FIGS. 1 and 2, the framework 200 is expanded and the heat chamber enclosure E is in the open position. This type of accordion framework arrangement is well understood by the skilled artisan.

Segment pairs 202 comprise a rigid material to support compression of the framework 200 which, in turn, supports the enclosure E in an open position. FIG. 4 illustrates two sets of segment pairs 202. Each segment pair 202 comprises an upper segment 202U and a lower segment 202L of substantially equivalent length. The upper segment 202U is operatively connected with corner post 210 at fixed connection 205, which allows no vertical movement of upper segment 202U relative to corner post 210, but may, in certain embodiments, allow rotation of upper segment 203 thereabout, preferably in a substantially vertical plane that is disposed between adjacent corner posts 210 and occupied by segment pairs 202.

As illustrated, two segment pairs 202 are disposed in the substantially vertical plane between adjacent corner posts 210. The skilled artisan will recognize that this is not a limiting feature and, therefore, more than two segment pairs 202 may be disposed between adjacent corner posts 210. The basic connection structure for segment pairs 202 is best illustrated in FIG. 4. The elements of one segment pair 202, comprising lower segment 202L and upper segment 202U are moveably connected at rotatable connection 3, while the elements of another segment pair 202, also comprising lower segment 202L and upper segment 202U are moveably connected at rotatable connection 4. Thus, connections 3 and 4 enable moveable connection between the two illustrated segment pairs 202. Connections 3 and 4 may comprise any rotatable connection mechanism which allows rotation of lower segment 202L and upper segment 202U relative to one another within the substantially vertical plane between adjacent corner posts 210. Such connection mechanisms are well known in the art. Further, lower segments 202L are rotatably connected with each other at rotatable connection 1 in similar manner so as to allow rotation of lower segments 202L relative to one another and within the substantially vertical plane between adjacent corner posts 210. Similarly, upper segments 202U are also rotatably connected with each other at rotatable connection 2 to allow rotation of upper segments 202U relative to one another and also within the substantially vertical plane between adjacent corner posts 210.

As illustrated, the lower segment 202L is in operative connection with framework adjustment mechanism 212. Framework adjustment mechanism 212 is vertically slidably adjustable along corner post 210. The operative connection mechanism 214 between lower segment 202L and framework adjustment mechanism 212 allows rotation of lower segment 202L in the substantially vertical plane disposed between adjacent corner posts 210 and which is also occupied by segment pairs 202. Operative connection mechanism 214 may, as the skilled artisan will readily recognize, comprise an assembly of bolt, washer and nut or the equivalent. Each such equivalent is within the scope of the present invention.

Framework adjustment mechanism 212 in certain embodiments is capable of frictional fixation along corner post 210. Thus, as is well known, the framework adjustment mechanism 212 may comprise a screw which is capable of gripping the corner post 210 to fix the mechanism 212 in place and further capable of unscrewing and releasing the gripping hold on corner post 210 for adjustment of position. Those skilled in the art will recognize equivalents to the mechanism for gripping and releasing corner post 210; each of which is within the scope of the present invention. In this manner, each of the framework adjustment mechanisms 212 may be substantially simultaneously slid upward or downward along the associated corner posts 210, thereby causing the segment pairs 202 to collapse or expand.

Thus, as illustrated, sliding the framework adjustment mechanism 212 downward along corner post 210 will result in the collapse of segment pairs 202, thereby urging adjacent corner posts 210 toward each other and collapsing the framework 200. This results in rotatable connections 1 and 2 to move vertically away from each other while rotatable connections 3 and 4 move horizontally toward each other, both such movements are within the vertical plane between adjacent corner posts 210. Conversely, expansion of the framework 200 is achieved by sliding the framework adjustment mechanisms 212 upward along the associated corner posts 210, thereby urging the expansion of the framework 200 by moving adjacent corner posts 210 away from each other. This results in rotatable connections 1 and 2 to move vertically toward each other, i.e., closer to each other, while rotatable connections 3 and 4 move horizontally away from each other, both such movements are within the vertical plane between adjacent corner posts 210.

Figure 5:
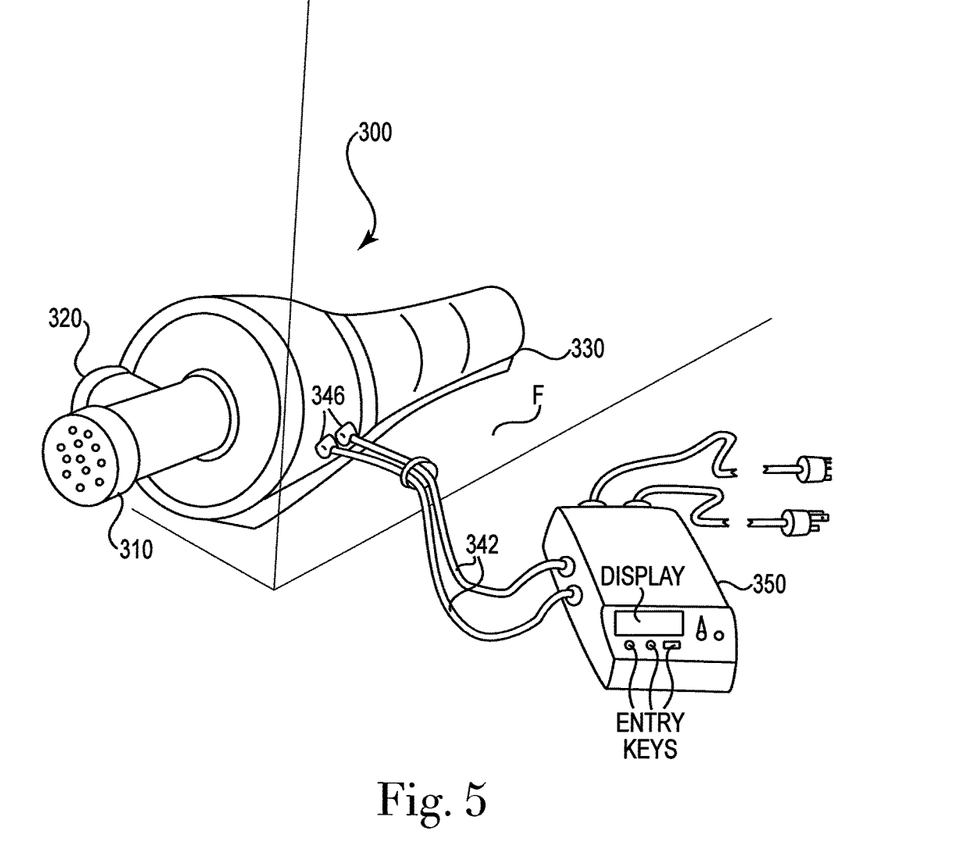
FIG. 5 is a partial cutaway perspective view of one embodiment of the present invention.
Figure 6:
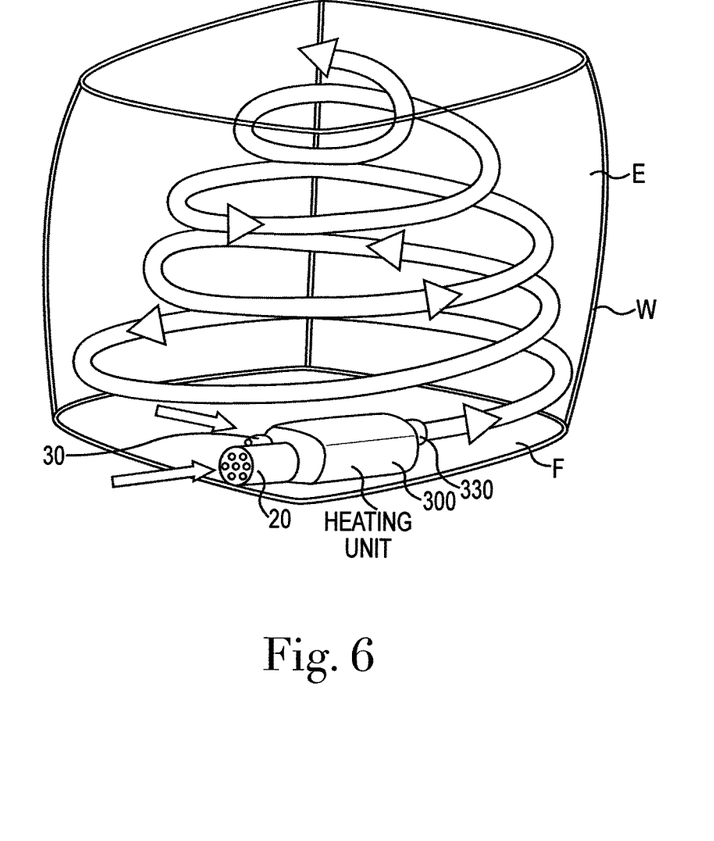
FIG. 6 is a partial cutaway perspective view of one embodiment of the present invention.

Once the heat chamber enclosure E is in the open position using the enclosure framework 200 as described above and before the at least one door D is sealed, i.e., zipped close and the hook and loop material engaged, the heating system 300 is placed inside the closure as best seen in FIGS. 5 and 6. Heating system 300 comprises a fresh air intake 310 which engages a sealable fresh air port 20 of enclosure E. This allows fresh air to be pushed into the enclosure E during the period of operation that positive pressure is building. When positive pressure is achieved in enclosure E, fresh air intake 310 is covered. This allows recirculation of the heating and, ultimately, heated air via the recirculation intake 320 of heating system 300. Heating and, ultimately, heated air is heated within heating system 300 and blown out at a known rate of flow through hot air exit 330.

Heating system 300 is thus positioned to operate within enclosure E, with the fresh air intake 310 in fluid communication with the external ambient environment during the ramp up to positive pressure within the enclosure E. Heating system 300 further comprises one or more electrical connections 340 which access the heating system 300 via the sealable utility access port 30. Electrical wires 342 thus connect heating system 300 with a controller unit 350, disposed outside of enclosure E. Controller unit 350 comprises the electrical supply for heating system 300 as well as programmable control of the various operational methods for the present invention.

Figure 8A:
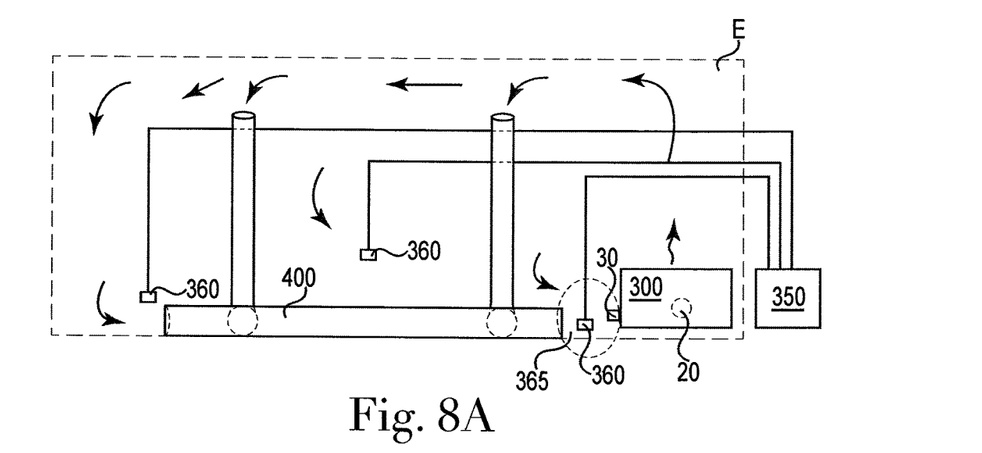
FIG. 8A is a front partial cutaway view of one embodiment of the present invention.
Figure 8B:
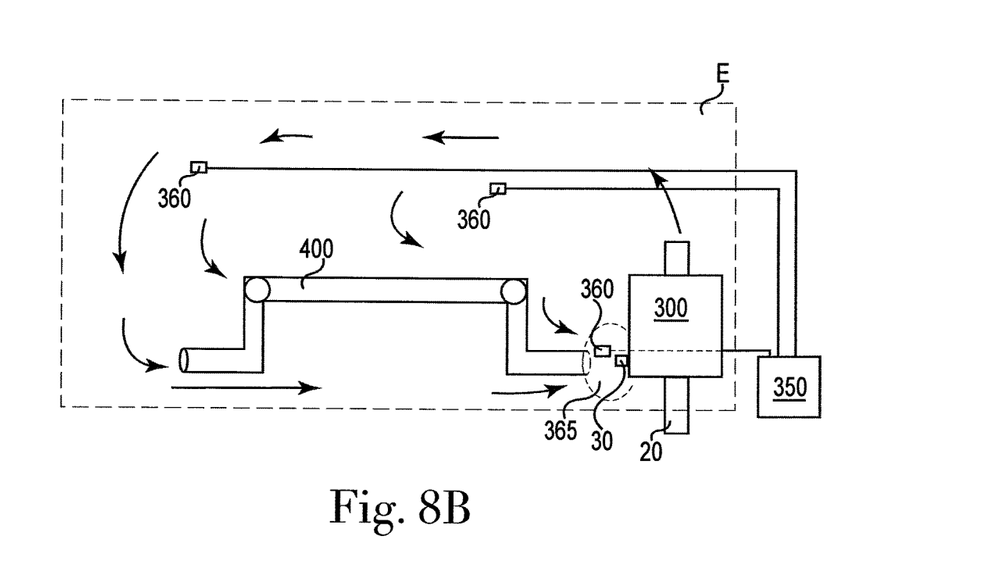
FIG. 8B is a top partial cutaway view of one embodiment of the present invention.

The present invention further comprises at least two, and preferably three, thermocouples 360 which are placed within enclosure E at strategic locations and which are operatively connected, via sealable utility access port 30 with controller 350 which is capable of displaying the temperature reading of the individual thermocouples 360 within enclosure E. The thermocouples may be direct connect or wireless sensors or both. Such an arrangement is best illustrated in FIGS. 8A and 8B. The primary thermocouple is located within the sphere or zone of lowest pressure 365 within the enclosure E, located at a point near the recirculation intake 320. This is one of several critical locations within enclosure E to monitor and ensure temperature conformance with a programmed setpoint temperature. Other thermocouples 360 may be positioned, e.g., within crevices in furniture or beneath cushions to ensure that these areas are treated at the programmed setpoint temperature. Thermocouples are present also to collect time/temperature data which may be later used for computer analysis or print out to verify that proper treatment cycle has been performed.

Thus, returning to FIG. 5, controller 350 comprises a display for monitoring temperature readings of the thermocouples 360. In addition, controller 350 comprises a programmable memory within, with entry keys for programming the operational method as well as selecting the appropriate operational method that may be pre-programmed and saved within the programmable memory. The display may also allow monitoring of the progress and status of the currently operating operational method within enclosure E.

As shown in the Figures, heating system 300 rests on, or near, the floor of the heat chamber enclosure E and in a known manner takes in fresh air, heating it to a set temperature and blows it out of a hot air port as well understood in the art, building positive pressure within enclosure E, relative to the external ambient environment. When the positive pressure is established, fresh air intake 310 is covered or otherwise partially interrupted so that warm air inside the enclosure is recirculated via the heating system's recirculation port 320, to help maintain the air temperature above the set temperature and to maintain the desired positive pressure within enclosure E. Fresh air intake is maintained at a smaller volume so as to make up for zipper/access port/fabric material leakage in order to maintain the enclosures pressure and dynamic shape.

The controller is programmable to heat and cool down the enclosure, i.e., by actuating the heater at and up to a certain programmed temperature, at a rate that will kill the insects in the enclosure while protecting any heat-sensitive items located in the chamber/enclosure during the operation. An exemplary program and or method of the present invention may comprise:

1. Turning heating system and controller on;
2. Selecting program within controller's memory, or alternatively, programming into the controller's memory a new program;
3. Actuating heater to begin drawing in fresh air through fresh air intake port, heating the freshly drawn air and driving positive pressure within enclosure E;
4. Achieving desired positive pressure;
5. Partially interrupting fresh air intake port, thereby allowing engagement and operation of the heater's recirculation port;
6. Allowing system to heat to a programmed temperature setpoint, e.g., 120 F, 125 F, 135 F or alternate setpoint, within the selected and programmed ramp time period;
7. Reaching programmed temperature setpoint and maintaining the recirculating air at the programmed temperature setpoint for a programmed time period, e.g., 4 hours to soak the enclosure's contents at the programmed temperature; and/or until verification by the thermocouples that the articles being treated have reached treatment temperatures in their core.
8. Ramping the temperature within the enclosure down after the exemplary 4-hour soak, the ramping down may be achieved within e.g., 1 hour;
9. Heater shut down, blower continues until enclosure is cooled to room temperature;
10. System is turned off after enclosure temperature equilibrates to approximately room temperature;
11. Enclosure is opened and articles removed.

Figure 7A:
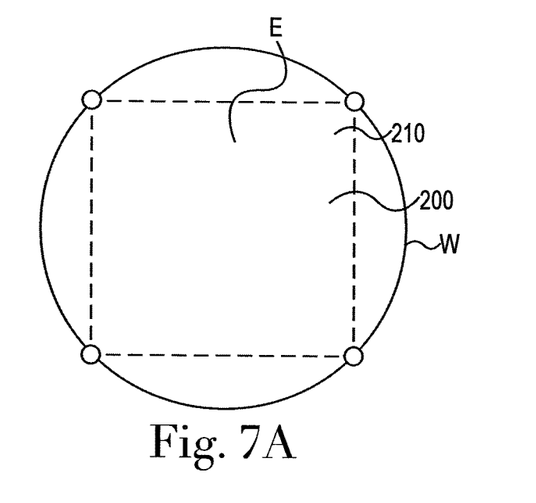
FIG. 7A is a top partial cutaway view of one embodiment of the present invention.
Figure 7B:
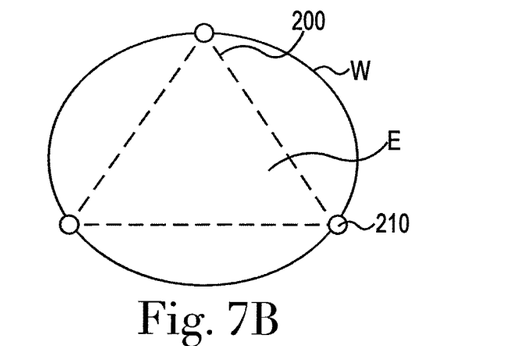
FIG. 7B is a top partial cutaway view of one embodiment of the present invention.
Figure 7C:
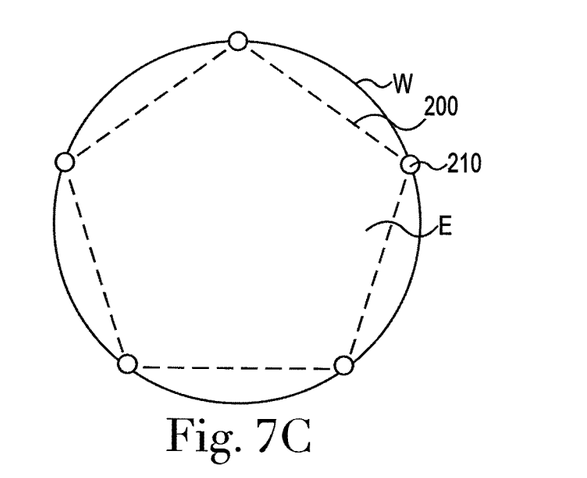
FIG. 7C is a top partial cutaway view of one embodiment of the present invention.

As discussed, the controller 350 communicates an actuating signal to the heating system which begins to heat and blow the heated air into the sealed enclosure E creating a positive pressure. The heated air rises as it is expelled from the heating system 300 that is disposed on the floor F of the enclosure E, creating an efficient heating chamber and an upward spiral cyclonic effect as best shown in FIG. 6. Thus, as illustrated in FIGS. 7A-7C, the corners of the illustrated enclosure E become rounded as the walls W are pushed outward on the positive pressure inflation of the enclosure E by the heated air. In each case, when the enclosure E is inflated, the walls W will push outward and the enclosure E will become substantially rounded, with smooth corners to facilitate the upward spiral cyclonic effect. Consequently, as illustrated, the hot air circulates in an upward spiral from the hot air exit 330 of the heating system 300 to the ceiling C of the enclosure E, creating a cyclone effect on the air moving inside the enclosure E. This achieves several essential purposes in the present invention. First, the cycloning heated air allows all items placed in the enclosure E to reach the programmed desired temperature at a faster rate then either simple radiant heat, or with a heater 300 that is not located on the floor F, or with a rigid enclosure E that will not allow the cyclonic effect to be realized. Second, the heating system 300, particularly its blower, plays a major role in inflating the wall material W which, in addition to the air circulation benefits, also pulls the wall W and ceiling C materials away from any items within the enclosure E, eliminating contact between those items and the side walls W as well as the ceiling C. This helps ensure there are no cool spots for the insects, i.e., bed bugs, to escape the treatment temperatures.

Turning again to FIGS. 8A and 8B, racks 400, preferably assembled from 2"-4" PVC hollow pipe, are provided to support mattresses and box springs, etc., on their sides or otherwise with adequate air separation and access to all surfaces. FIG. 8A provides a front schematic view of one embodiment of a rack 400 during operation and FIG. 8B shows the same embodiment of rack 400 in a top view. Further the racks 400 may comprise, e.g., ⅜", drilled holes therethrough for allowing free movement of the heated air under and around the racked item.

Figure 9:
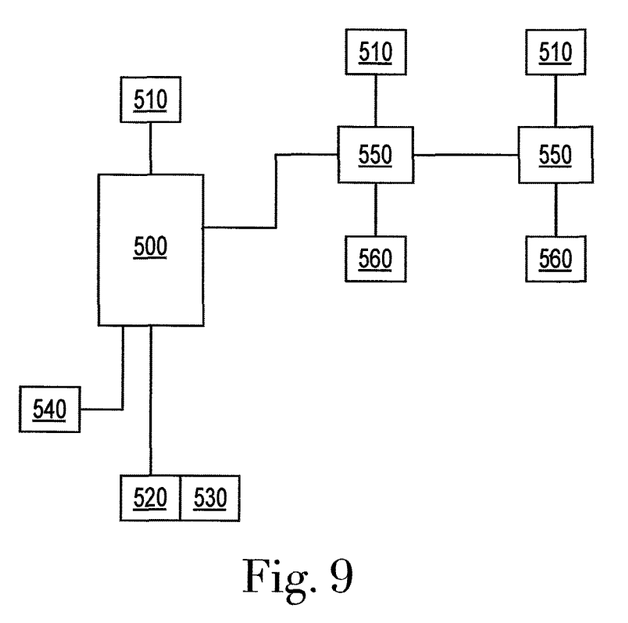
FIG. 9 is a block diagram of the one embodiment of the present invention illustrating a primary control unit and two secondary control units.

An alternative embodiment for the present invention is illustrated in block diagram form in FIG. 9. FIG. 9 illustrates a primary controller 500 having an input connection to a 120 volt AC, 15 ampere power source 510, including a circuit breaker thereon, not shown but as is commonly known. Power source 510 provides power to the primary controller 500. Primary controller 500 comprises operative connections to a primary heater 520 and a blower motor 530. Primary heater 520 and blower motor 530 are similar to the embodiment illustrated in FIGS. 5, 8A and 8B. Primary controller 500 is located outside enclosure E, while primary heater 520 and blower motor 530 are located within the enclosure E as describe above and as in FIGS. 5, 8A and 8B. Primary controller 500 comprises a display for monitoring temperature readings of the attached thermocouples 540. Preferably, at least one thermocouple 540 will be attached to the primary controller 500 and will be placed within enclosure E at strategic locations as described in connection with FIGS. 5, 8A and 8B.

Primary Controller 500 also comprises a programmable control of the various operational methods of the present invention in a manner similar to that described above in connection with controller 350. Thus, primary controller 350 comprises a processer and an internal memory, with entry keys, for storing the programmed operational method and for programming the operational method, as well as selecting the desired operational method that may be pre-programmed and saved within the programmable memory. Display thus may allow for viewing of the set point temperature, time within the programmed operational method, actual temperatures read by the thermocouple(s) 540 and AC amperage being drawn by primary heater element 520. The primary heater element 520 is powered in operative connection with the primary controller 500 and via a solid state relay (SSR) from PID signals, an arrangement that the skilled artisan will be familiar with.

In addition to the primary controller 500, this embodiment of the present invention may also comprise at least one secondary controller 550. As illustrated in FIG. 9, two secondary controllers 550 are provided, each in operative connection and communication with primary controller 500 whereby the primary controller 500 serves as the master and the at least one secondary controller 550 serves as the slave in a well-known arrangement. Each secondary controller 550 comprises its own power source 510 to which it is operatively connected. In addition, each secondary controller 550 may be operatively connected with a secondary heater 560 to provide supplementary heating to enclosure E. Secondary heater(s) 560 may be structured and arranged as described above in connection with element 300 in FIG. 5. The secondary controller 550 and associated secondary heater 560 may be used within the same enclosure as primary heater 520 to supplement the heating therein.

Each secondary controller 550 in this system will provide 120 volt AC, 15 ampere power to its associated secondary heater 560 through SSR from PID signals as described above in association with the primary controller 500 and primary heater 520. Secondary controller(s) 550 may also comprise a display, which illustrates the AC amperage being drawn by the associated secondary heater 560.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A method for treating pest insects, comprising:
providing a portable, expandable and sealable enclosure including an insulated material;
placing a primary heating system within the enclosure, the heating system having an air intake that is in fluid communication with an environment external to the enclosure, a hot air exit that is within the enclosure and a recirculation intake that is in fluid communication with an environment inside the enclosure;
providing a primary programmable controller that is in operative communication with the primary heating system, wherein the primary programmable controller is located external to the enclosure and is capable of programmable control of the primary heating system and display of its progress status and electrical load;
providing at least one secondary controller in operative connection with the primary controller, each at least one secondary controller comprising its own power source;
providing a secondary heater in operative connection with each of the at least one secondary controller, each of the secondary heaters comprising power input from the operatively connected at least one secondary controller, wherein the at least one secondary controller and the secondary heater in operative connection therewith operate in accordance with a set of instructions residing in a memory of the primary controller;

placing items to be treated within the enclosure;

providing at least two thermocouples inside the enclosure, the at least two thermocouples being in operative communication with the primary controller, wherein the primary controller is capable of displaying a temperature corresponding to each thermocouple;

programming the primary programmable controller with a setpoint temperature, a ramp up time period to reach the setpoint temperature, a soak time at the setpoint temperature and a ramp down time period for cooling the enclosure down to a temperature of the environment external to the enclosure;

sealing the enclosure;

actuating the heating system, thereby forming a volume of heated air inside of the enclosure;

allowing fresh air into the enclosure with the fresh air intake of the heating system;

reaching a desired positive pressure;

sealing the fresh air intake of the heating system; and recirculating the volume of heated air within the enclosure with the recirculation intake;

heating the volume of heated air up to the setpoint temperature according to the ramp up time period;

maintaining the volume of heated air at the setpoint temperature for the soak time; and cooling the volume of heated air down according to the ramp down time period.

2. The method of claim 1, wherein the enclosure comprises a plurality of walls, the method further comprising pressuring the environment inside of the enclosure such that the walls of the enclosure bulge outwardly.

3. The method of claim 1, wherein a cyclonic upward spiral air flow results within the enclosure.

4. The method of claim 3, wherein the setpoint temperature is within a range of 120 degrees F. to 150 degrees F.

5. The method of claim 4, wherein the insect pest comprises bed bugs.

6. The method of claim 3, further comprising identifying a zone of lowest pressure within the enclosure.

7. The method of claim 6, further comprising placing one of the at least two thermocouples within the zone of lowest pressure.

8. The method of claim 7, further comprising forming the enclosure with three walls.

9. The method of claim 7, further comprising forming the enclosure with more than three walls.

10. The method of claim 9, further comprising providing at least one door and at least one viewing window in the enclosure.

11. The method of claim 10, further comprising providing a three-sided zipper around the at least one door and hook and loop material around the at least one door and at least one viewing window to ensure sealing of the enclosure.

* * * * *